Patented Aug. 1, 1939

2,168,279

UNITED STATES PATENT OFFICE 2,168,279

RUBBER DERIVATIVE

Benjamin S. Garvey, Akron, Ohio, assignor to The B. F. Goodrich Company, New York, N. Y., a corporation of New York No Drawing. Application May 26, 1936, Serial No. 81,873

3 Claims. (Cl. 260—771)

This invention relates to the production of derivatives of rubber and has for its object the preparation of stable, chemically resistant materials suitable for the preparation of paints, molding plastics, and so forth.

I have found that the treatment of rubber with substantially anhydrous hydrogen fluoride yields more or less hard, thermoplastic products whose solubility depends on the conditions under which they are prepared. When made under suitable conditions, a product is formed which is very soluble in the usual rubber solvents and is resistant to thermal decomposition and the action of most chemicals. The types of product obtained are illustrated in the following examples:

*Example 1.*—Tubes of soft vulcanized rubber are exposed to the vapors of substantially anhydrous hydrogen fluoride. The tubes become hard and rigid.

*Example 2.*—A piece of unvulcanized crepe rubber is immersed for several hours in liquid, anhydrous hydrogen fluoride. The hydrogen fluoride is then allowed to evaporate. The product is hard and brittle.

*Example 3.*—Hydrogen fluoride gas is passed into 500 cc. of a gasoline solution containing 25 g. of well masticated rubber. In about 25 minutes the cement gels. This gel is broken up and soaked in acetone to remove the solvent. The product is horny and insoluble in all of the common solvents. On the other hand, the products obtained by precipitation from the cement before it gels are not sensibly different from the rubber used as a starting material.

*Example 4.*—Hydrogen fluoride gas is passed into 500 cc. of a p-cymene solution containing 25 g. of well masticated rubber. The temperature rises considerably. In 15 to 20 minutes some 15 to 18 or 20 g. of hydrogen fluoride are absorbed and absorption of gas practically stops. The clear, reddish solution is allowed to stand a few hours and is then poured into two liters of acetone. The product is precipitated from the turbid solution by the addition of about 10 cc. of concentrated hydrochloric acid. It is filtered, washed with acetone, and air dried. The product is a fine white powder readily soluble in gasoline, benzene, and chlorinated hydrocarbons.

*Example 5.*—Five liters of a benzene solution containing 250 g. of well masticated rubber are put into a copper container equipped with a vigorous stirrer, an inlet tube for hydrogen fluoride gas, a vent, a stop-cock for drawing off samples of cement and a large outlet for rapid emptying of the cement. The agitator is started and hydrogen fluoride gas is bubbled in rapidly. Small samples are drawn off periodically through the small stop-cock and examined. The solution at once begins to get warm. In about 5 minutes the viscosity drops considerably and after 7 or 8 minutes it is almost as low as that of pure benzene. Accompanying this change in viscosity is a color change from yellow through orange to red. When the solution becomes orange and the viscosity is at a minimum, the whole charge is dumped as fast as possible into 25 liters of acetone acidified with 100 cc. of concentrated hydrochloric acid. The acetone is vigorously agitated. A fine white precipitate forms which filters readily. When washed in acetone and dried the product is a fine white powder readily soluble in hydrocarbon and chlorinated solvents.

If the charge is dumped too soon the product is gummy. If dumped a little too late the product appears to be satisfactory until attempts are made to dissolve it when it is found to be only partly soluble. If the charge is not dumped at this stage it soon gels, and if this gelled material is recovered it is found to be insoluble in all of the usual solvents.

While acetone has been used as the precipitant in these examples other non-solvents such as alcohol can be used.

Analysis of the soluble product shows the presence of about 3.75% fluorine, whereas the theoretical value a product of the empirical composition for $C_5H_8.HF$ is 19.4% fluorine. However, this product can be obtained only by the use of quantities of hydrogen fluoride much larger than would be indicated by these results. The preferred hard product is produced by the addition of at least one mole and preferably 1.5 to 2.5 moles of anhydrous hydrogen fluoride for each theoretical isoprene unit of the rubber. The material has an iodine number of 75 which shows about 20% of the unsaturation of rubber. These results indicate that the product is partly a hydrogen fluoride addition product and partly a cyclorubber, that is, an isomer of rubber. It is a hard, brittle material which gives films resembling those from unplasticized nitrocellulose. The product is generally thermoplastic and if desired can be rendered more plastic and more easily soluble by mechanical working.

When suitably plasticized and pigmented the product gives excellent lacquers which age well and are resistant to acids, alkalies, and salts. Its properties make it valuable as a molding plastic and as an adhesive.

The treatment of articles of soft vulcanized rubber permits the formation of new types of article from this derivative. The treatment of filaments or threads of rubber permits the formation of insoluble fibers of value for the preparation of special fabrics.

The best results are obtained with substantially anhydrous hydrogen fluoride as water considerably retards the desired reaction.

The term "rubber" when used in the claims and specification is intended to include caoutchouc, gutta percha, balata, and synthetic rubbers derived from butadiene or substituted butadienes in the unvulcanized, vulcanized, or reclaimed condition.

This application is a continuation in part of my application Serial No. 53,105 filed December 5, 1935.

I claim:

1. Process for the preparation of thermoplastic compositions which comprises isomerizing rubber dissolved in an inert organic solvent therefor by bringing the solution in contact with from 1.5 to 2.5 moles of anhydrous hydrofluoric acid (as such) per isoprene unit of the rubber.

2. Process for the preparation of thermoplastic compositions which comprises isomerizing rubber dissolved in an aromatic hydrocarbon solvent by bringing the solution in contact with at least one mole of anhydrous hydrofluoric acid (as such) per isoprene unit of the rubber.

3. Process for the preparation of thermoplastic compositions which comprises isomerizing rubber dissolved in an aromatic hydrocarbon solvent by contact with from 1.5 to 2.5 moles of anhydrous hydrofluoric acid (as such) per isoprene unit of the rubber.

BENJAMIN S. GARVEY.